No. 853,126. PATENTED MAY 7, 1907.
J. A. SHIRES.
RAIL SPREAD INDICATING DEVICE.
APPLICATION FILED OCT. 31, 1906.
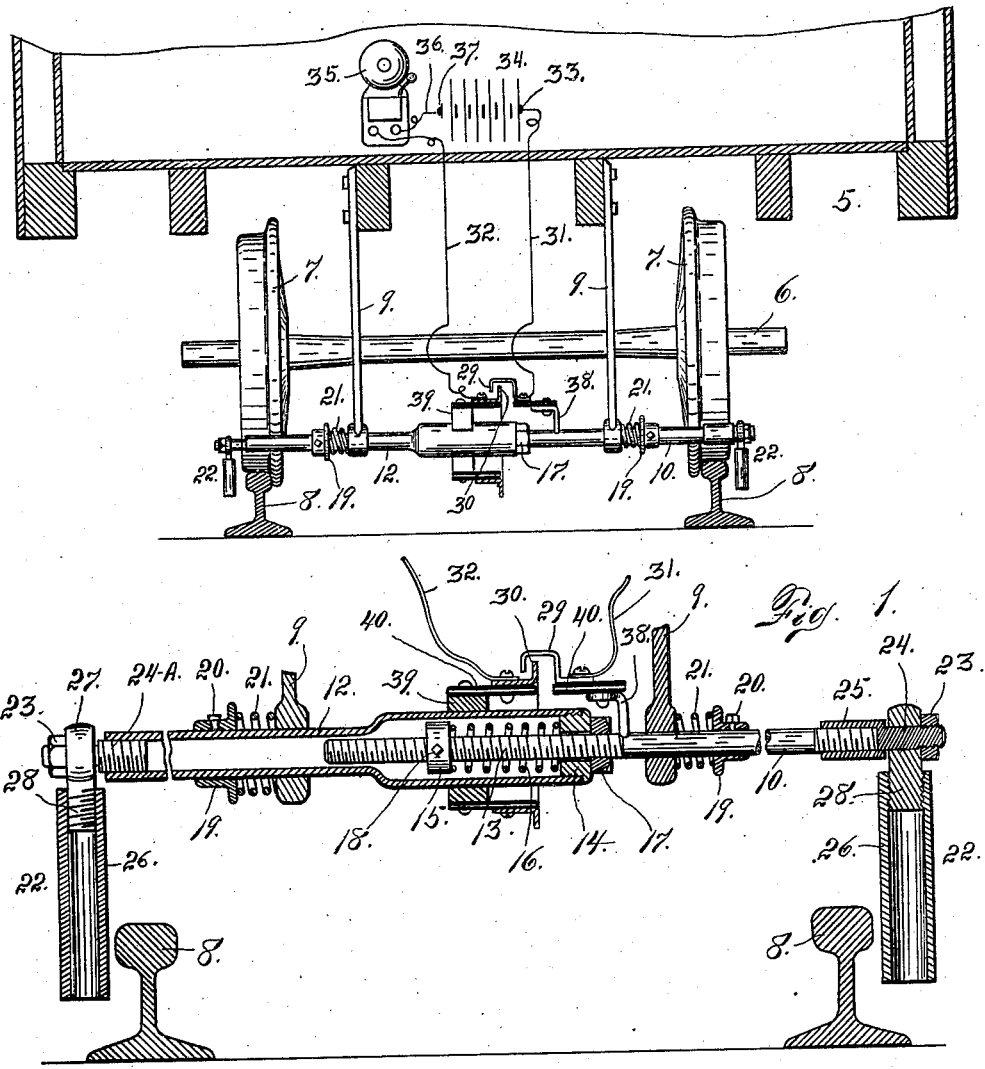

UNITED STATES PATENT OFFICE.

JOSEPH A. SHIRES, OF DENVER, COLORADO.

RAIL-SPREAD-INDICATING DEVICE.

No. 853,126.     Specification of Letters Patent.     Patented May 7, 1907.

Application filed October 31, 1906. Serial No. 341,489.

*To all whom it may concern:*

Be it known that I, JOSEPH A. SHIRES, a citizen of the United States, residing in the city and county of Denver and State of Colorado, have invented certain new and useful Improvements in Rail-Spread-Indicating Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in devices for indicating that railway rails are spread, the object being to notify the engineer of this condition of the rails and thus enable him to stop the train as soon as possible.

The device may be so constructed as to indicate a very slight spread of the rails and it is believed that the train may be stopped before the increase in the spread will be sufficient to derail the train.

My improved device consists of a simple attachment mounted on the train preferably underneath the locomotive, or tender consisting of a bar composed of two telescoping members to each of which is connected a hanger, the said hangers occupying positions outside of the rails of the track but in close proximity thereto. The two telescoping members are so connected that they normally maintain the hangers in the said position. However, in case the rails are slightly spread, they will act on the hangers to elongate the bar to which the hangers are attached and bring into engagement two contacts mounted on the respective members of the bar. The engagement of these two contacts close the circuit in which an alarm device is located. This alarm device should be in the cab of the engine or in such proximity to the engineer that he will readily hear the signal.

It is evident that any suitable alarm may be employed either a bell, an electric light or a combination of bell and electric light. In other words the signal may be either audible, visual or both as may be desired.

Having briefly outlined my improved construction I will proceed to describe the same in detail reference being made to the accompanying drawing in which is illustrated an embodiment thereof.

In this drawing, Figure 1 is a fragmentary sectional view taken through the lower part of a locomotive or car equipped with my improved rail spread indicating mechanism. In this view one axle and a pair of wheels are illustrated. Fig. 2 is a detail view of the indicating mechanism shown partly in section and on a larger scale. In this view the railroad rails are also shown in section.

The same reference characters indicate the same parts in both views.

Let the numeral 5 designate a car or locomotive; 6 an axle; 7 the wheels of the car; and 8 the rails of the track which the treads of the wheels engage.

As shown in the drawing the locomotive 5 is provided with two depending supports 9, in which are slidably mounted telescoping bar members 10 and 12. The bar member 12 is hollow and into it protrudes a threaded part 13 of the bar 10. The inner extremity of the hollow member 12, is provided with a bushing 14 threaded thereinto, and through which the threaded part 13 of the member 10 slides freely. Between this bushing member which forms a shoulder and a nut 15 threaded on the part 13 of the member 10, is a coil spring 16 which acts to hold a nut 17 threaded on the member 10, against the bushing extremity of the member 12. The nut 15 being adjustable on the part 13, the tension of the spring 16 may be regulated at will. This nut 15 is provided with a set bolt 18 for locking it in the desired position of adjustment. The bar composed of the two telescoping members 10 and 12 may be elongated or shortened, by adjusting the nut 17. On opposite sides of the center of the bar, each telescoping member is provided with an adjustable collar 19 held in place by a set bolt 20. These collars are located outside of the supports 9. Between the said supports and the collars 19 are located coil springs 21, which serve to maintain the bar in its normal position.

To the outer extremity of each of the members 10 and 12 is loosely applied a hanger 22, each hanger being held in place on its bar member by a nut 23.

The outer extremity of the bar member 10 is screwed in the sleeve 25. In the opposite end of the sleeve is also fitted the part 24 which is of less strength than the bar member 10 in order to make it more easily broken in case the hanger 22, which is applied thereto, strikes an unusual obstruction, thereby preserving the remainder of the device.

Into the hollow member 12, is threaded a stub spindle 24A similar to the part 24. This stub spindle is reduced at its outer extremity the same as the part 24. Each hanger 22 is composed of a hollow body part 26, and an eye 27 having a threaded shank 28 which is screwed into the top of the body member 26. The eye portion of the hanger is mounted freely on each bar member and may swing to one side or the other in case it strikes an obstruction. These hangers 22 are normally in close proximity to the rails 8 but are not supposed to touch them except where the rails are spread or separated sufficiently to bring them into contact with the hangers; and when this spread condition is of any considerable magnitude, the bar will be elongated sufficiently to bring two contacts 29 and 30 into engagement. From these contacts lead conductors 31 and 32. The conductor 31 leads to a pole 33 of a source of electricity 34; while the conductor 32 leads to an alarm device 35. From this alarm device a conductor 36 leads to the opposite pole 37 of the source 34. The contact 29 is mounted upon an angle-shaped bracket 38, one extremity of which is connected with the bar member 10. This contact is insulated from the bracket and consequently from the bar members and their connections. The contact 30 is mounted upon the hollow bar member by means of a block 39. The contacts are insulated from their respective bar members by insulating plates 40.

When the apparatus is in use, the bar carrying the hangers 26 is supposed to have a limited degree of transverse movement bodily, to compensate for lateral displacement which is not of sufficient magnitude to elongate the telescoping bar.

From the foregoing description the use and operation of my improved device will be readily understood.

Assuming that it is mounted upon the car or locomotive substantially as shown in Fig. 1 of the drawing, in case the rails are separated by the lateral displacement of either or both, the action of the rails on the hangers 22 will elongate the indicator bar and bring the two contacts 29 and 30 into engagement, thus closing the circuit through the signal 35 and notifying the engineer as heretofore explained.

It is preferred that the contact 30 mounted on the extensible bar member 12, shall extend entirely around the bar, so that in case either bar member shall rotate independently of the other or make a partial turn independently of the other member, the two contacts will always be in position to close the circuit.

Having thus described my invention, what I claim is:

1. A rail spread indicating device consisting of an extensible bar suitably mounted on the train and provided with depending hangers normally occupying positions outside of the rails of the track, but in close proximity thereto, an electrical circuit, and normally separated contacts arranged to close the circuit as the indicator bar is elongated due to the spreading of the rails, substantially as described.

2. In a rail spread indicating device, the combination of a car or locomotive, an electrical circuit, a signal therein, an extensible bar mounted on the car and having hangers normally occupying positions on the outside of the rails, the said bar being composed of two telescoping parts, and normally separated contacts respectively mounted on the parts of the bar and adapted to be brought into engagement to close the electrical circuit and operate the signal as the bar is elongated due to the spreading of the rail, substantially as described.

3. A rail spread indicator comprising a bar composed of two telescoping spring-retained members, the opposite extremities of the bar being provided with hangers occupying positions on the outside of the rails, the bar being extensible, and its two members being respectively provided with contacts adapted to be brought into engagement as the bar is extended due to the spreading of the rails, an electrical circuit in which the contacts are located, and a signaling device located in the circuit.

4. A rail spread indicator comprising an extensible bar composed of two spring-retained telescoping members, the outer extremities of the bar being provided with hangers occupying positions on the outside of the rails, the said hangers being mounted to swing freely upon the bar, the two members of the bar being provided with normally separated contacts, and a signaling circuit in which the contacts are located, the said contacts being arranged to be brought into engagement as the bar is elongated due to the spreading of the rails.

5. A rail spread indicating device consisting of a bar composed of two extensible members, normally spring-held in a predetermined position and provided with depending means occupying positions outside of the rails of the track but in such proximity thereto as to be acted on by the spread of the rails to elongate the bar, an electrical circuit, and means mounted on the bar for closing said circuit when the bar is extended, substantially as described.

6. A rail spread indicating device comprising an extensible bar composed of a plurality of members, normally spring-retained in a predetermined position, the said bar being provided with means arranged to be acted on when the rails are spread, to cause the extension of the bar, an electrical circuit, and means mounted on the bar for closing said circuit when the bar is extended, substantially as described.

In testimony whereof I affix my signature in presence of two witnesses.

JOSEPH A. SHIRES.

Witnesses:
 DENA NELSON,
 A. J. O'BRIEN.